Figure 10:
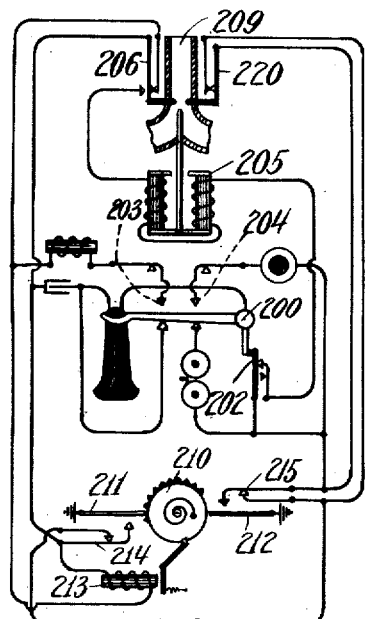

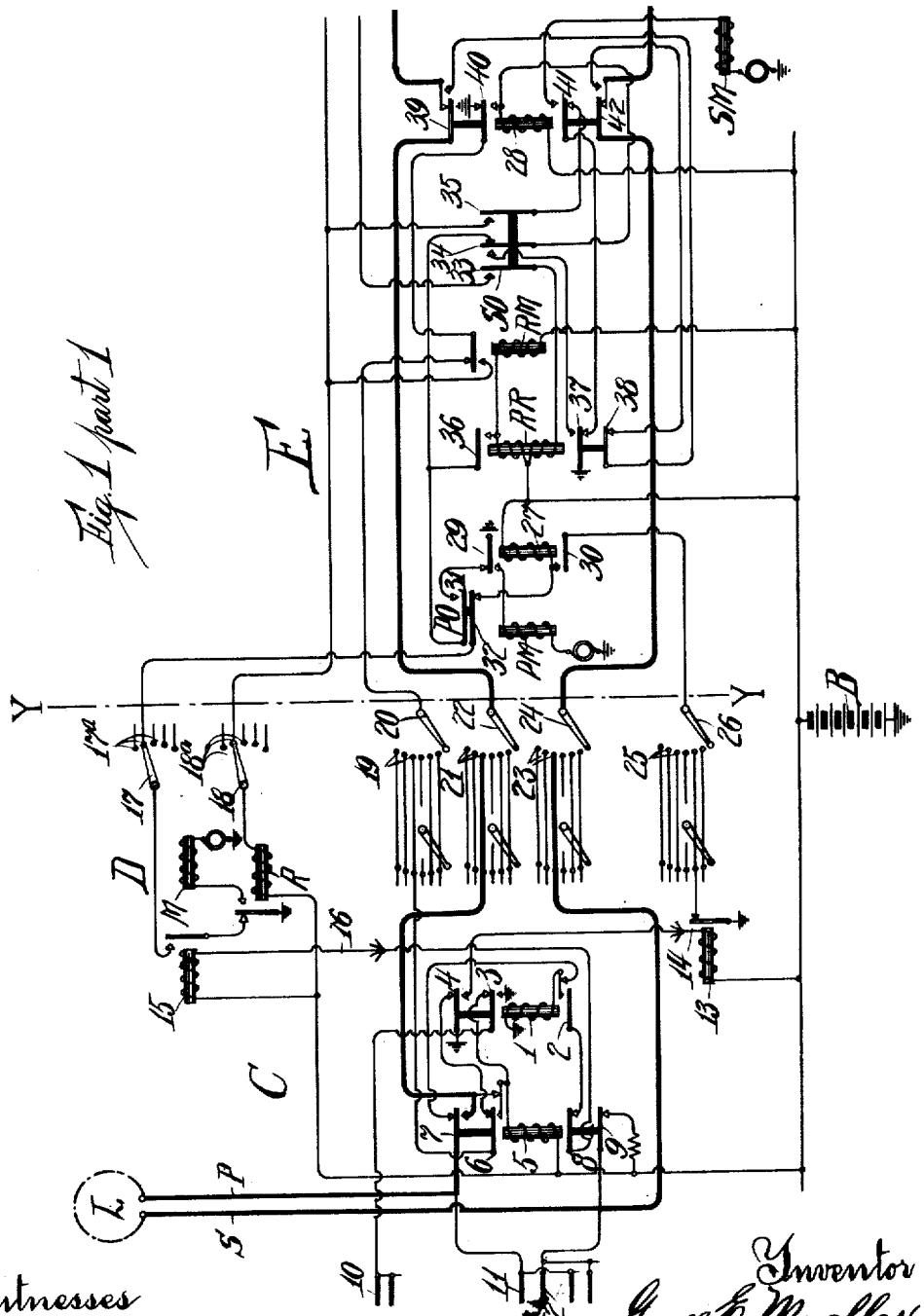

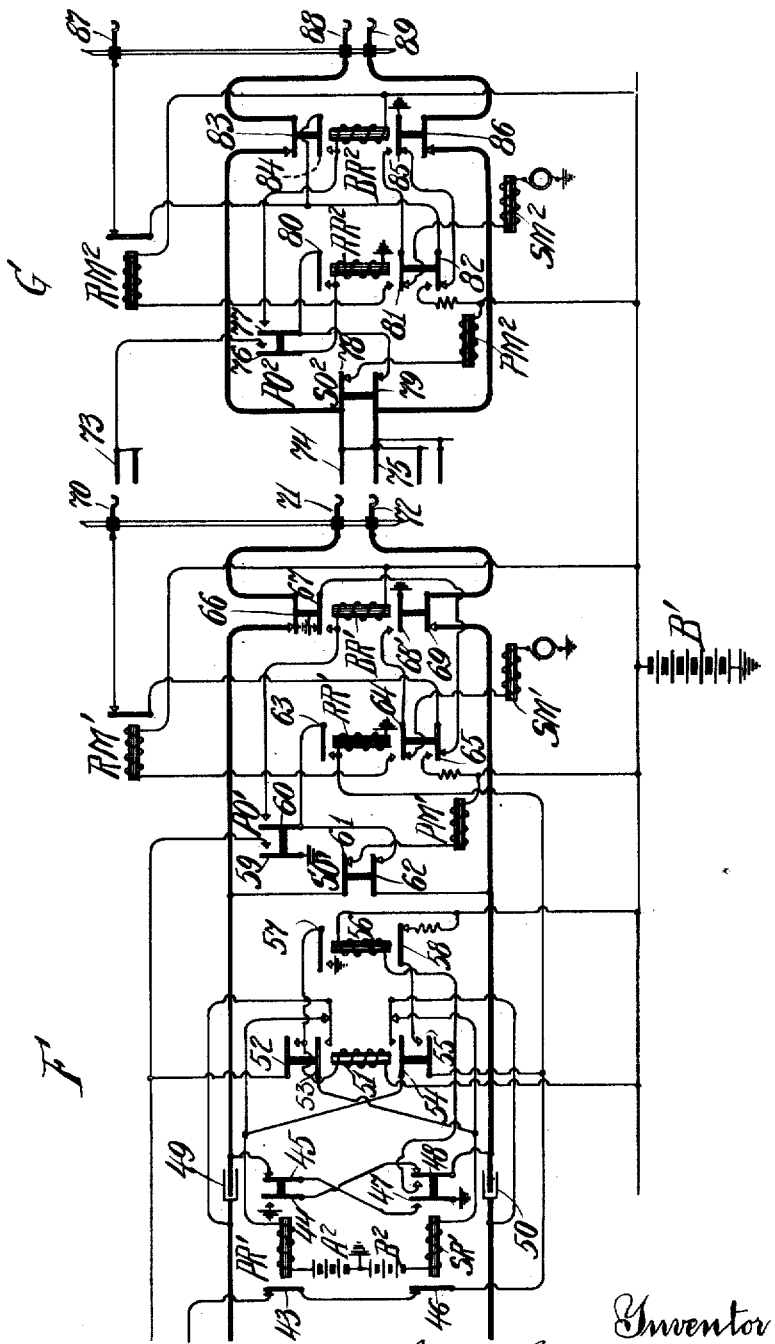

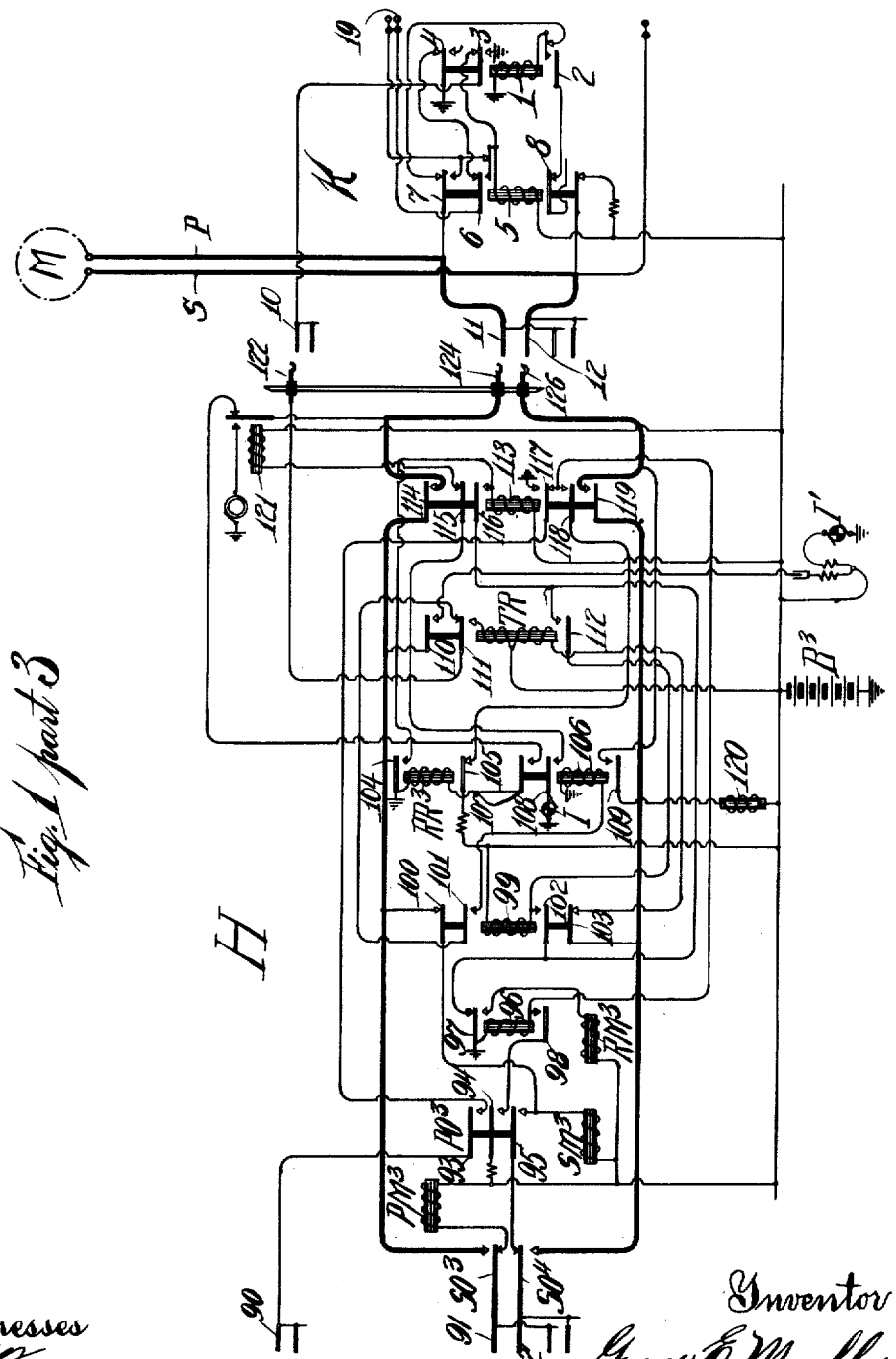

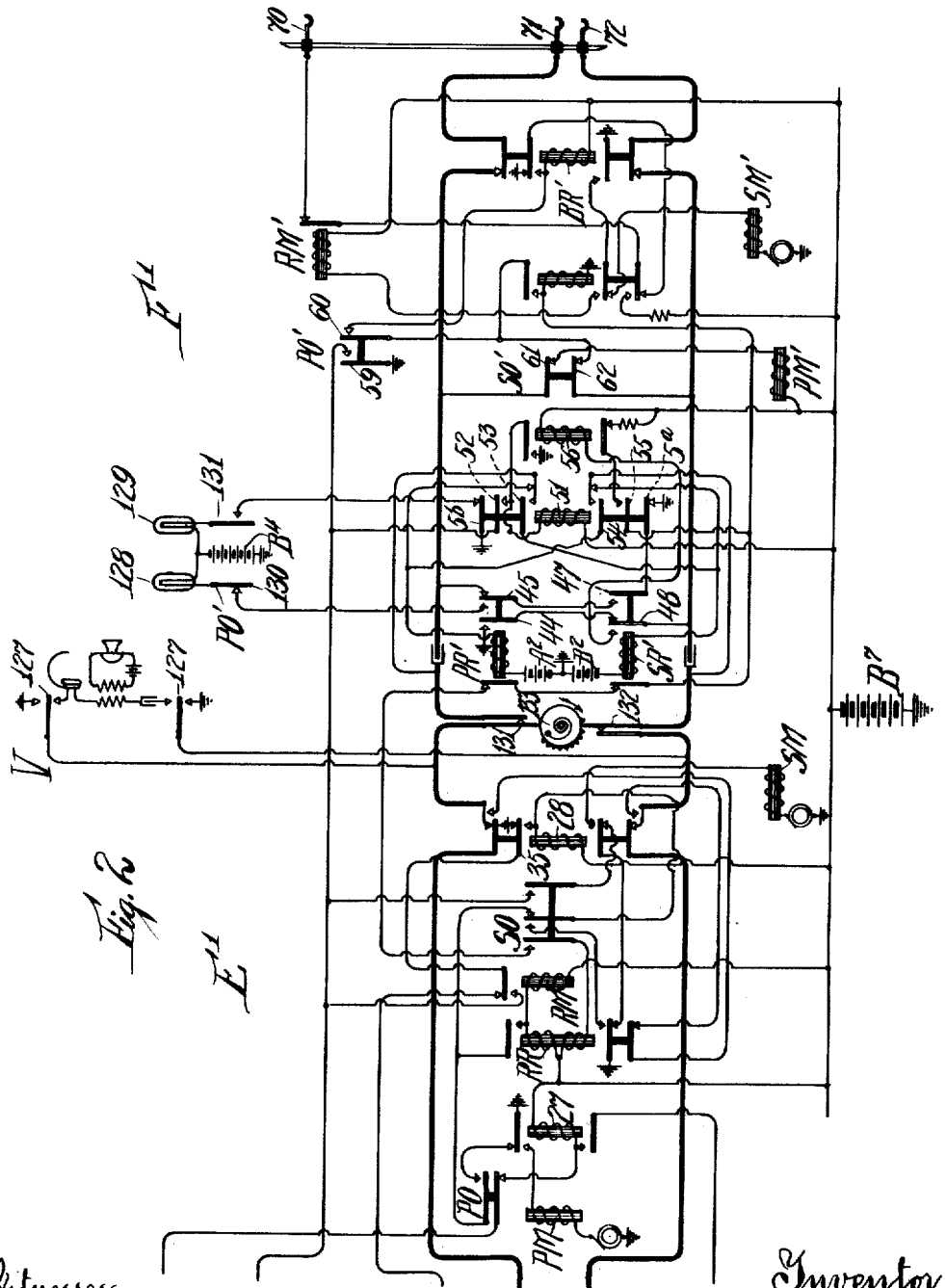

G. E. MUELLER.
TELEPHONE PAY STATION.
APPLICATION FILED DEC. 7, 1907.
1,174,599.
Patented Mar. 7, 1916.
7 SHEETS—SHEET 5.
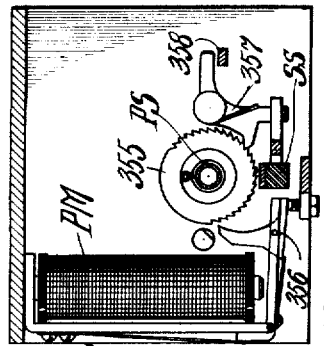
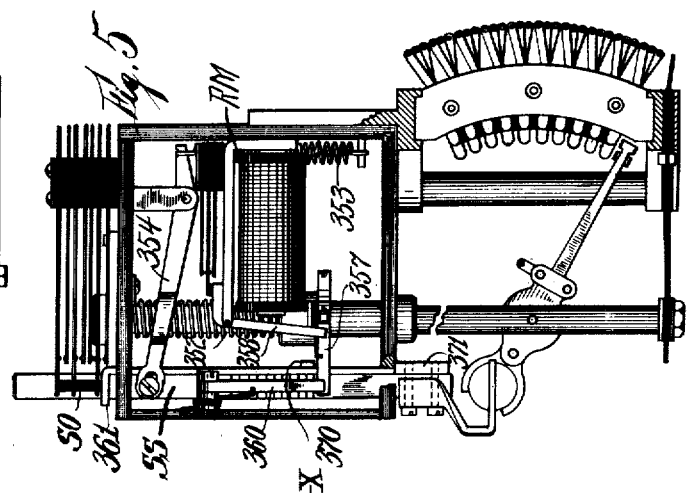
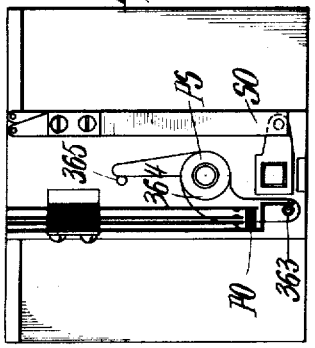
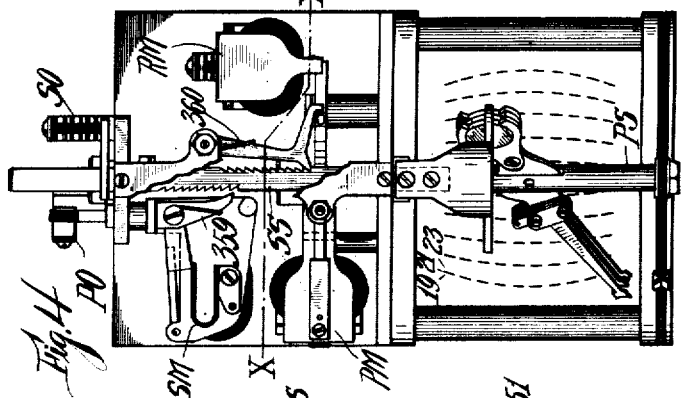
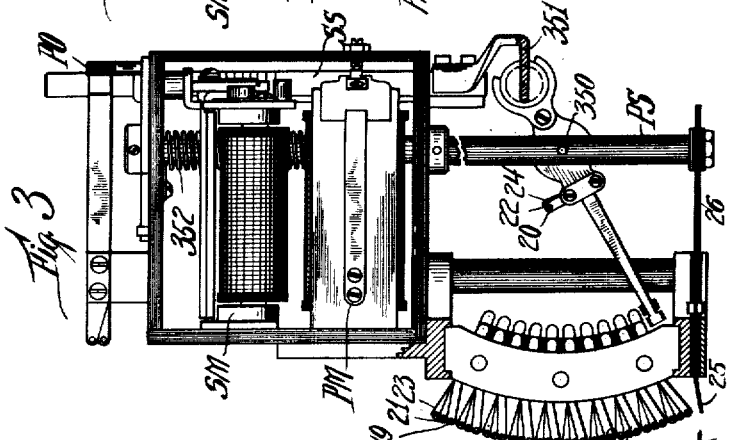
Witnesses
J. H. Ferguson
J. G. Kellogg
Inventor
George E. Mueller
by Leroy D. Kellogg
Atty.

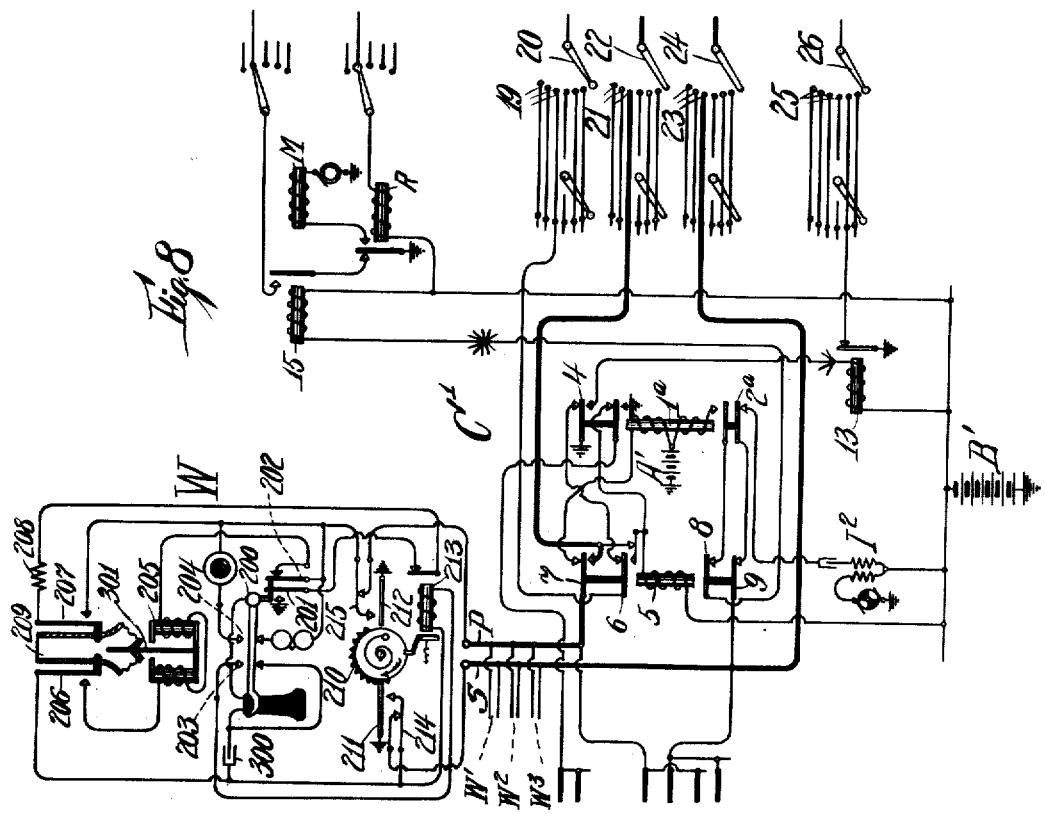
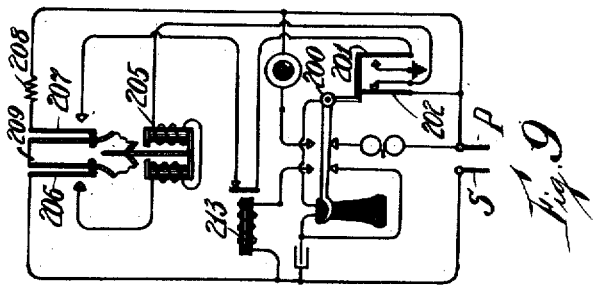

G. E. MUELLER.
TELEPHONE PAY STATION.
APPLICATION FILED DEC. 7, 1907.

1,174,599.

Patented Mar. 7, 1916.
7 SHEETS—SHEET 7.

Witnesses
J. H. Ferguson
J. G. Kellogg

Inventor
George E. Mueller
by Leroy D. Kellogg
Atty.

UNITED STATES PATENT OFFICE.

GEORGE E. MUELLER, OF AURORA, ILLINOIS, ASSIGNOR, BY MESNE ASSIGNMENTS, TO KELLOGG SWITCHBOARD & SUPPLY COMPANY, A CORPORATION OF ILLINOIS.

TELEPHONE PAY-STATION.

1,174,599.   Specification of Letters Patent.   Patented Mar. 7, 1916.

Application filed December 7, 1907. Serial No. 405,602.

*To all whom it may concern:*

Be it known that I, GEORGE E. MUELLER, residing in Aurora, county of Kane, and State of Illinois, have invented new and useful Improvements in Telephone Pay-Stations, of which the following is a specification.

Generally speaking, my invention relates to pay-station devices and systems wherein the deposit of a coin or token is required at the substation before the connection can be completed through the central office, the coin being collected in case the desired connection is completed, and being returned to the subscriber in case the connection is not completed.

Generally stated, an object of my invention is to provide a system, wherein a single magnet is employed to control the collection or return of a coin, previously deposited, organized in a relatively simple manner so that the cost of maintenance and inspection shall be slight, and which shall at the same time operate in a thoroughly reliable and satisfactory manner.

In carrying out the invention, I have so arranged the system that the replacing of the receiver upon the hook switch at the calling substation at the conclusion of conversation will operatively connect a polarized magnet, which controls the disposition of the coin, in circuit with the central office battery, the said magnet collecting or restoring the coin to the subscriber according to the direction of the current flow through the substation at the time the receiver is replaced.

In organizing the system, I have arranged it in such a manner that the connections of the central office battery, which is preferably bridged across the calling line, are reversed as soon as a called subscriber answers, the reversing connections being maintained thereafter independently of the acts of the connected subscribers until the calling subscriber replaces his receiver.

In developing my invention, I have specially borne in mind the requirements of automatic and semi-automatic telephone practice and systems, and it is in such connection that I have elected to illustrate and describe my invention, although in its general aspects, it is not restricted to those specific employments, and I do not wish to be limited in this respect.

Referring to the drawings, I have shown in Figure 1, consisting of Parts 1, 2 and 3, circuits of an automatic telephone system capable of employment in connection with the substation arrangements of the invention. In Fig. 2, I have shown circuit apparatus capable of operating in connection with certain parts of Fig. 1, as hereinafter indicated, to realize the advantages of a semi-automatic telephone system, such semi-automatic system being also adapted for employment in connection with certain of the substation circuits illustrated. Figs. 3, 4 and 5, are elevations of a selective switch mechanism, diagrammatically illustrated, which may be employed in connection with the circuits of Figs. 1 and 2. Fig. 6 is a top view showing the off-normal switch combination of the selective switch, and Fig. 7 is a sectional view on line X X of Fig. 4, showing more particularly the primary magnet and its associated mechanism. In Fig. 8, I have shown a substation circuit comprising the coin controlled mechanism of my invention, said circuit being connected by a telephone line with a line circuit at the exchange, the whole organized to render it adaptable for party-line service. In Figs. 9, 10, 11, 12 and 13, I have illustrated telephone substation circuit connections in connection with the coin collecting mechanism of my invention.

Before proceeding to a description of the substation arrangements, I shall first describe the telephone systems in connection with which they are to be operated, the said systems constituting the environment in which the preferred form of my invention, as herein illustrated, is shown.

Referring first to Fig. 1, the three parts thereof constitute a single circuit diagram, in considering which, Part 1 is to be placed at the left and Part 3 at the right, with Part 2 between them.

In Fig. 1, Part 1, I have shown at the left a telephone line including the limbs P, S, connected with a line circuit C at the exchange. The circuits of the substation to which the limbs P, S extend are not illustrated in Fig. 1, it being understood that any suitable arrangement may be provided. It is sufficient for the present description to state that the substation mechanism may comprise the usual hook lever capable, on removal of the receiver at the substation, of disconnecting the bell circuit and connecting in the talking circuit, together with a suitable impulse transmitter adapted to transmit directive impulses over the line limbs, the directive impulses being produced by successive openings of limb P, while limb S is maintained grounded at the substation; at the conclusion of each set of impulses over limb P, a single break in the circuit of limb S is produced while limb P is maintained grounded. After each set of impulses, the metallic circuit of the limbs P and S will be reëstablished free from ground at the substation.

At the exchange, the line circuit C may comprise multiple called terminals 10, 11, 12, appearing in the banks of a suitable number of connectors, along with similar terminals of other telephone lines. Assuming an exchange of ten thousand lines, the said lines, as called lines, are preferably divided according to their directory numbers into groups of one hundred, the terminals of each one hundred appearing together before the wipers of say, ten connectors (on the usual ten per cent. basis). The said terminals of a line group are preferably divided into ten sub-groups or sections, primary adjustments of the wipers of a connector being produced to select a sub-group of line terminals, whereafter secondary movements of the said wipers in an intersecting plane are produced to select the terminals of the individual line wanted. Similarly, multiple calling terminals 19, 21, 23, are provided for each line which preferably appear along the terminals of ninety-nine other lines in the contact banks before the wipers of a suitable number of line selectors E, of which ten would be provided for one hundred lines on the ordinary ten per cent. trunking basis. The one hundred sets of terminals 19, 21, 23 in the banks of a line selector, are preferably divided into ten sub-groups of ten contact sets each, primary movements of wipers 20, 22, 24, of a line selector E being caused to select a sub-group of contacts including those of the calling line, whereafter, the secondary movements of the said wiper will be caused, in an intersecting plane, to select the terminals of the individual calling line. Each sub-group of contacts at a line selector E is provided with its individual group contact 25, there being one such group contact for each sub-group of terminals. The group wiper 26, by wiping over the group contacts 25, controls the primary movements of the line selector E to select the group, whereafter the secondary travel of the switch in search of the individual contacts of the calling line is controlled by the individual private wiper 20 engaging the individual private multiple contacts 19.

The line selectors E are preferably not constantly operating devices, but are normally at rest. A master-switch mechanism D is provided for each group of subscribers' lines as calling lines, said mechanism having terminals 17ª, 18ª of each line selector E which serves the line group to which the master-switch D belongs, whereby upon initiation of a call over any line of the group, the master-switch D will initiate travel of an idle line selector E to select the calling line.

Each line selector E has preferably a first selector F which may comprise the adjustable wipers 70, 71, 72, having before them multiple terminals 73, 74, 75 of second selectors G, which terminals will be divided into ten groups of ten sets each, the terminals of each group being connected to second selectors G assigned for connection to a different thousands of the exchange. The first selectors F have their wipers adjusted responsive to directive impulses to select the group of multiple contacts forming terminals of the second selectors G assigned for connection to the thousand including the line of the called subscriber, whereafter automatic travel of wipers 70, 71, 72, will be caused to select the terminals of an idle connector, all in the well known manner.

Each second selector G may comprise wipers 87, 88, 89, having before them one hundred sets of multiple contacts 90, 91, 92, forming terminals of connectors H. Said terminals are preferably divided into groups of ten sets before the wipers of the second selectors, the terminals of each group being connected to connectors H assigned for connections to a hundred lines of the thousand which the second selector G, before whose wipers the terminals appear, serves. The second selector G is first operated responsive to directive impulses to select the group of contacts 90, 91, 92, forming terminals of connectors assigned to the hundred among which the called-for line is contained, whereafter automatic travel of the selector G is produced to select the terminals of an idle connector.

The connectors H have before them multiple terminals 10, 11, 12, of the one hundred lines which they serve, the said terminals being preferably divided into ten groups before the wipers of the connector according to the tens value of the directory numbers which the lines have. The wipers 122, 124, 126, are first adjusted in a primary direction responsive to primary impulses, to select the group of ten terminals including those of the called line, whereafter secondary adjustments of the said wipers are produced responsive to directive impulses, to select the individual terminals of the called-for line out of the group. After a connection has been completed from the calling line to the called line, the mechanism of the connector H is operated so as to test the called line, the arrangement being such that if the called line be busy, a signal will be extended to the calling subscriber, whereas if the said line be idle, a ringing generator will be connected thereto to ring the bell at the called sub-station, and when the called subscriber answers the call by removing his receiver, the conversation may proceed.

Assuming that the calling subscriber, whose line extends to substation L in Fig. 1, Part 1, desires to connect his line for conversation to that of subscriber M, whose number for the purposes of description may be assumed to be 2345, the subscriber at L, removing his receiver, causes limbs P, S to be conductively united whereon current flows from battery B through normal contact 9, over limb S returning over limb P, normal contact 7, line relay 1 to ground. Relay 1 energizes, armature 2 locking the said relay through contact 8, wire 16 and the relay 15 of master-switch D to battery, it being understood that the wire 16 is a common wire having branches, one to each armature 8 of the cut-off relays 5 of the lines that D serves. Armature 3 places ground upon the contacts 10 at the connectors making them busy, while armature 4 disconnects ground from the multiple contacts 19 of the line at the line selectors rendering them selectable, and by engaging its alternate contact, operates group relay 13, whose attracted armature removes ground from the group contacts 25 of the said group among which line L has its individual terminals, 19, 21, 23.

Since wipers 17, 18 of master-switch D normally engage contacts 17$^a$, 18$^a$ of an idle line selector E, the now attracted armature of relay 15 closes a circuit from ground through contact 17, 17$^a$, through primary off-normal (PO) contact 32 and relay 27 to battery, which relay, by armature 29, causes generator pulsations through magnet PM which steps wipers 20, 22, 24, 26, upon their primary travel, each step bringing wiper 26 to engage a successive group contact 25 and the other wipers opposite a different sub-group of line terminals. Primary off-normal contact 32 (and also 31) being shifted on the first primary step, relay 27 depends upon locking armature 30 for its continued energizations, the relay 27 continuing energized by current through said attracted armature, the wiper 26 and to successive grounds through the contacts 25 of sub-groups whose relays 13 are unoperated. In the present case, as soon as wiper 26 reaches the second contact 25, relay 27 will be deënergized and its armatures fall back whereafter magnet PM remains inert. A circuit is then closed from ground through normal contact 29, shifted contact 31, normal contact 34, relay 28 to battery, which relay energizes and, by its armature 41, closes a circuit for generator impulses through magnet SM which is now successfully actuated, stepping wipers 20, 22, 24, on their secondary travel in search of contacts of the calling line, wiper 26 remaining motionless engaging the selected contact 25. On the first secondary step of switch E, the secondary off-normal (SO) contacts 33, 34, 35, were shifted, 34 opening the initial energizing circuit of relay 28, the relay remaining dependent for continued energization upon attracted armature 40 which has now connected the relay with private wiper 20, the relay continuing energized over successive locking circuits established by wiper 20 as it engages, step-by-step, the private contacts 19 of non-calling lines which will be grounded at normal contacts 4 of their respective line relays 1. As soon as 20 engages the contact 19 of the calling line, relay 28 will be deënergized since such contact will be ungrounded and armature 41 opens the circuit of magnet SM preventing further stepping of line selector E whereby wipers 20, 22, 24, remain engaging contacts 19, 21, 23, of the calling line L. Armature 41 falling back, closes a circuit from ground through normal contact 37, normal contact 41, shifted contact 35, through contact 18$^a$, 18, relay R to battery, operating the relay R which closes a circuit through magnet M which steps wipers 17, 18, over the contacts 17$^a$, 18$^a$, as long as relay R continues energized, which relay will continue energized until wiper 18 engages a contact 18$^a$ of an idle line selector E, which contact will be ungrounded. When this occurs, relay R deënergizes and master-switch D stops. Before switch D can select the contact of an idle line selector, relay 15 will be deënergized, as hereafter explained, so that the selected idle line selector will not be started.

As soon as relay 28 was first energized, relays PR' and SR' were simultaneously operated by the closing of the alternate contacts at 39 and 42, the contacts at the said points being make-before-break in character, both on attractions and retractions of the armatures. When relay 28 was deënergized, a circuit was closed from battery A$^2$ through relay PR', normal contact 39, cut-off relay 5 to battery, operating relay 5, which by armature 6, locked itself to ground at 40, and by armature 7 closes a circuit from battery A$^2$ through relay PR' over limb P, returning over limb S through relay SR' to battery B$^2$, this substitute circuit for relay PR' and SR' occurring without any interruption of their energizations. Armature 8 of relay 5 deënergizes relays 15 and 1, whereupon armature 3 of the latter connects ground at normal contact 40, through attracted armature 6 to contacts 10 at the connector to hold them busy.

Subscriber L now operates his calling device to open the circuit of limb P twice while holding the limb S grounded at the substation, whereby relay PR' is deënergized twice (relay SR' remaining energized), and two current impulses caused to flow from ground at F, attracted armature 47, retracted armature 45, normal contact 61, magnet PM' to battery B', which magnet steps wipers 70, 71, 72, to select the second group of second selector contacts 73, 74, 75, forming terminals of second selectors assigned for connection to the second thousands of the exchange. Subscriber L now opens the circuit of limb S once while holding limb P grounded, whereby relay SR' is deënergized (relay PR' remaining energized), whereon current flows from ground through attracted armature 44, retracted armature 48, normal contact 62, primary off-normal (PO') contact 60, shifted (as was contact 59) on the first step of switch F, busy relay BR' to battery, operating the said relay, which, by armature 68, causes generator impulses through magnet SM', stepping wipers 70, 71, 72, on their secondary travel which will continue as long as relay BR', now connected by armature 67 to wiper 70 is continued energized by wiper 70 engaging successive grounded contacts 73, contacts 73 of busy second selectors being characterized by a ground connection. As soon as wiper 70 reaches a contact of an idle second selector which will be ungrounded, no locking-circuit for relay BR' will exist, the relay will be deënergized and armature 68 retracted, preventing further actuations of magnet SM' whereby wipers 70, 71, 72, rest engaging the contacts 73, 74, 75, of an idle second selector G of the second thousands. Retracted armature 67 places ground upon the wiper 70 and the multiple contacts 73 of the selected second selector rendering it busy. The secondary off-normal (SO') contacts 61, 62, were shifted on the first secondary step.

The subscriber L now opens the circuit of limb P three times and the circuit of limb S once, as before, whereby relay PR' is deënergized three times and thereafter relay SR' once. The three deënergizations of relay PR' transmit three impulses from ground, as before, the current now passing through normal contact 66, contact 71—74, magnet PM² to battery, which magnet is actuated three times to move wipers 87, 88, 89 opposite a group of contact sets forming terminals of connectors assigned to the third hundred of the second thousands. The deënergization of relay SR following, transmits an impulse through normal contact 69, contact 72—75, normal contact 79, shifted contact 77, (the PO' contacts 76, 77, being shifted on the first step of the switch), relay BR² to battery, which relay energizes and by contact 85, causes pulsations through magnet SM² to effect secondary travel of the switch; armature 84 connects the relay to wiper 87 which engages successive contacts 90, establishing successive locking-circuits for relay BR² until a contact 90 of an idle connector H is engaged, the contacts 90 of busy contacts being grounded. This occurring, relay BR² is deënergized, preventing further actuations of magnet SM², and by armature 85, connects ground through normal contact 82 to wiper 87 engaging the multiple contact 90 of connector H whereby the connector is rendered busy. The secondary off-normal (SO²) contacts 78, 79, shifted on the first secondary step of the switch.

The subscriber L now opens the circuit of limb P four times and the circuit of limb S once thereafter, as before, causing four deënergizations of relay PR' and four current impulses to flow through contacts 71—74, 88—91, contact SO³, magnet PM³ to battery B³, actuating said magnet four times which causes four steps of wipers 122, 124, 126 to a position adjacent to the fourth sub-group of line terminals of its hundred including those numbered from 2341 to 2349 inclusive, followed by those of 2340. On the first step of the switch H, the primary off-normal (PO³) contacts 93, 94, 95, were shifted. The following deënergization of relay SR' transmits a current impulse through contacts 72—75, 89—92, the shifted contact 95 and magnet SM³, which magnet is energized a single time and steps wipers 122, 124, 126, a step toward the selected group of contacts, it being understood that the positions of the wipers of a connector are normally two steps distant from the edge of their contact bank. By this first step, contact SO³ was shifted to engage its alternate contact, and contact SO⁴ shifted to disengage its normal contact, but not sufficiently to engage the alternate contact, two secondary steps of the connector being required to effect this.

Subscriber L now causes five breaks of the circuit of the limb P followed by one of limb S, as before, whereby relay PR' is deënergized five times and five impulses transmitted, as before, through contacts 71—74, 88—91, alternate contact SO³, contact 100, magnet SM³ to battery, whereby five secondary steps of wipers 122, 124, 126, are effected, the last of which will leave them engaging contacts 10, 11, 12, of line 2345, that indicated at M. The following deënergization of relay SR' transmits an impulse as before, through contacts 72—75, 89—92, alternate contact SO⁴, contact 103, lower winding of test relay TR to battery B⁸, which relay is energized to test the called-for line. By armature 112, relay TR energizes relay 99, circuit being traced from battery through relay 99, armature 112, to ground at normal contact 97 whereon relay 99 locks itself by armature 102 to ground at 97.

Assuming first that the called-for line is idle, in which case the multiple contacts 10 will, as shown, be connected to battery B³ through normal contact 3 and relay 5 of its line circuit K, relay TR will, on the cessation of the impulse transmitted by relay SR', be deënergized since attracted armature 111 will have connected its upper or locking winding with the same side of battery B³ to which contact 10 is connected. The armatures of relay TR now retracting, current flows from ground through relay 106, attracted armature 101, normal contact 111, contact 122—10, normal contact 3, relay 5 to battery, operating relay 5 which, by armature 6, connects the ground through relay 106 to the private multiple contacts 19 of the called line at the line selectors rendering said contacts busy. Armature 8 disconnects line relay 1 from the called line. Armature 108 connects interrupter I with relay 121 which is now energized and deënergized alternately connecting and disconnecting generator from the called-for line, giving the well known periodic ringing, generator current passing through contact 124—11, over limb P through the called-for substation, returning over limb S, contact 12—126, attracted armature 109, to ground through battery B³. As soon as the called subscriber answers and the armature of relay 121 is retracted, circuit is closed from ground through release relay RR³, attracted armature 107, normal contact at relay 121, out over limb P and through the conductive bridge at the substation produced by the elevated hook lever, returning over limb S, attracted armature 109 to battery B³. Armature 104 now operates relay 113 which, by armature 116, locks to ground at contact 97. Armature 115 disconnects relay 121 from interrupter I so that the relay remains thereafter inert, while armatures 114 and 110 close contacts in the talking conductors of the connector, the talking circuit throughout Fig. 1 and the other circuit diagrams being indicated by heavily marked conductors. As soon as relay 113 is energized, a branch of the before traced current extending from ground through relay RR³ out over limb P, returning over limb S, is established through attracted armature 119, thence to the left over the lower talking conductor, through attracted armature 48 and relay 56 to battery B', energizing the relay 56 whose attracted armature energizes the reversing relay 51, which latter, by armature 52, locks itself to ground at shifted contact 59. Relay 51, by its attracted armatures 53 and 54, now reverses the connections of batteries A² and B² to the upper and lower conductors of the talking circuit of first selector F, current now flowing from the positive or active pole of battery A², through relay PR', alternate contact 54, over the lower talking conductor, over limb S, returning over limb P, through alternate contact 53, and through relay SR' to the negative side of battery B², said batteries A² and B² being grounded at their intermediate points. Thus, the direction of current flow in the calling line is automatically reversed when the calling subscriber answers the call, and it is this reversal which I employ in connection with my coin collecting structures. The calling and called subscribers are now in conversation over a circuit which may be traced by the heavily marked conductors from substation L to substation M, the transmitter at L being supplied by current over the circuit just traced, while the transmitter at M is supplied by current from ground through relay RR³ flowing out over limb P, returning over limb S and to battery through impedance 120 at H, and the winding of relay 56 at F.

When the subscribers have finished conversation they replace their receivers. Assuming that subscriber L does so first, switches E, F and G are released and when subscriber M thereafter replaces his receiver, switch H will be released. This is accomplished as follows: The replacing of the receiver at substation L deënergizes relays PR' and SR' simultaneously for the first time since they were first operated. Current thereupon flows from ground through relay RR' at F, through retracted armatures 46, 43, the contact 33 at E, lower winding of relay RR to battery B. Relay RR is then energized and it closes a circuit from ground through armature 29, contact 31, armature 36, release magnet RM to battery, which magnet is energized and withdraws the retaining pawls of line selector E whose springs are then restored to normal, at which time the primary off-normal (PO) and secondary off-normal (SO) contacts will also be shifted to normal. During restoration, relay 28 will be held operated by current through attracted armature 37 of relay RR whereby the talking wipers 22, 24, will be on open circuits.

The energization of relay RR', by armature 63, locked itself in series with relay BR', which is thereby energized, and, by armature 65, connected battery B' through contact 70—73, contact 76, relay RR², to ground whereby RR² was energized and locked itself in series with relay BR². As soon as relays RR' and BR' were simultaneously energized, circuit was closed from ground through armature 68, alternate contact 64, release magnet RM' to battery B', whereby magnet RM' has energized to restore the first selector F to normal, the primary off-normal and secondary off-normal contacts being also restored. When relays RR² and BR² were energized as described, current flowed from ground through alternate contact 85, alternate contact 81, release magnet RM² to battery, operating the said release magnet RM² on whose energization the second selector G is restored to normal and also its primary and secondary off-normal switch contacts.

When the subscriber at M replaces his receiver, circuit is opened through release relay RR³ and current will flow from ground through relay 96, through alternate contact 118, normal contact 105, to battery B³. Energized relay 96, by armature 97, closes a circuit through release magnet RM³. On its energization, the connector is restored to normal and also its primary and secondary off-normal contacts, when all apparatus will be in its original idle condition. If subscriber M had first replaced his receiver, switches F, G and H would have been restored, the line selector E remaining to be restored by the calling subscriber L when he replaced his receiver.

The prior replacing of the receiver at substation M opens the line circuit causing deënergizations of relay RR³ and also of the relay 56 at F which was held energized in series with relay RR³, whereon retracted armature 58 would close circuit from battery B' through attracted armature 55, release relay RR' to ground whereafter the release of first selector F and second selector G would proceed as described. The release of connector H would occur as before described. It will be observed that although F is restored, the reversed connections of batteries A² and B² to the calling line are still maintained, since relay 51 is held locked by current through armature 52, spring 35 at E and contacts 41, 37 to ground.

When subscriber L now replaces his receiver, relay RR' at first selector F will be operated in the series of relay RR, as before described, and line selector E will be restored, as before described. If at the time the test relay TR was energized while wipers 122, 124, 126 of connector H were engaging contacts 10, 11, 12, of the called line, the said called line had been busy, its contacts 10 would have been grounded in one of the manners hereinbefore described. In such case, relay TR would have been locked when its armature 111 was attracted by current flowing from battery B³ through its upper winding, said attracted armature, wiper 122, and to ground through the engaged contact 10. Thus armature 110 would be held attracted and the busy signal would be transmitted from the interrupter I', through said attracted armature, over the upper talking conductor to the calling substation, the signal being heard in the substation receiver in the usual manner, returning over the lower talking conductor and through relay SR' to ground through battery B². The calling subscriber hearing the signal will replace his receiver and the switches E, F and G will be restored, as before described. In this case, the connector H will also be restored to normal since relay 113 has remained deënergized and the attracted armature 82 of relay RR² closes a circuit from battery B', through alternate contact 82, the back contact of armature RM² before the said magnet is energized, the contact 87—90, contact PO³, normal contact 117, relay 96 to ground, said relay 96 being energized and in turn energizing magnet RM³ which restores the connector to normal.

Referring now to Fig. 2, this figure is to be superposed upon Fig. 1 so that its wipers 70, 71, 72 are adjacent to the multiple contacts 73, 74, 75, of second selectors G, while the left edge of said Fig. 2 is to be placed on the dotted line Y Y of Fig. 1 when it will be understood that the conductors of Fig. 2 are to join the corresponding conductors of Fig. 1. At E' in Fig. 2 are shown the circuits of the line selector to which the wipers 20, 22, 24, 26, of Fig. 1 are now to be considered a part and to which the contacts 17ª and 18ª of Fig. 1 are now supposed to be connected. The said line selector E' is the same as that shown at E in Fig. 1, and description thereof is unnecessary. The first selector F' has substantially the same circuit arrangements as the first selector F of Fig. 1, and any particular description thereof is unnecessary, it being sufficient to point out the differences as between the two circuits. In Fig. 2, the calling lamp signal 128 and the ringing lamp signal 129 are assumed to be located at the operator's position at which is also the operator's set indicated as a whole at V and also the operator's calling device 133, controlling springs 131 and 132 connected in the upper and lower talking conductors of the first selector. All of this apparatus, of course, is in addition to that included in the first selector of Fig. 1.

For controlling the signal lamp 128, a front contact is added for armature 45 of relay PR', while the grounded connection of armature 47 of relay SR' is carried through a normal contact 5ª of relay 51. An additional primary off-normal (PO') contact 130 is provided to extinguish the lamp 128 on the first step of the first selector, while another contact 131 is provided to close a contact in the circuit of ringing lamp 129 on the first step of the first selector F'. The relay 51 has also an additional contact 5ᵇ included in the circuit of lamp 129 so that the lamp may be extinguished when the called subscriber answers the call.

In employing the system including Fig. 2 and the indicated portions of Fig. 1, substation equipments such as are used in manual telephone practice are employed, calling devices such as 133 being employed only at the operators' positions in the central office. Thus, assuming that at substations L and M, manual substation instruments are provided, the removal of the receiver at substation L will cause the line selector E' to select the calling lines in precisely the same manner as that in which the line selector E operated. As soon as, in the process of selection, the relays PR' and SR' are energized, as before described, the call signal lamp 128 at the operator's position will be displayed by current from ground through contact 5ᵃ, attracted armatures 47, 45, contact 130 and lamp 128 to battery. The operator observing the signal will press levers 127, 127, of her listening key to include her talking set in circuit with the calling line and will inquire the number of the line wanted. Having ascertained this, she will throw the said levers 127, 127 to engage their associated grounded contacts, whereby the calling line will be short-circuited, although relays PR' and SR' will be maintained energized as before. The operator will then actuate by hand the calling device 133 in the direction of the arrow, thereafter releasing it when its associated spring will turn it back to normal. As many breaks will be caused by its return at spring 131 in the circuit of relay PR' as teeth have been moved to the right of said spring, and after the last of these breaks and the reënergization of relay PR' the lower most tooth of dial 133 will cause a single break in the circuit of relay SR' causing its momentary deënergization. It is thus apparent that the operator may, with the aid of the calling device 133, produce successive sets of deënergizations of relays PR' and SR' to count out the number of the called subscriber, just as did the calling subscriber in the description of Fig. 1, the impulses transmitted by the deënergization of the said relays, operating precisely as described in connection with Fig. 1, first to operate the first selector F' and thereafter the second selector G and the connector H to connect with the called-for line. When the operator completes the transmission of the impulses, she restores levers 127, 127, and the circuit for relays PR' and SR' as reëstablished without interruptions of the energizations of said relays over the calling subscriber's line. The testing of the called line and restoration to normal of the various switch parts are produced just as described in connection with Fig. 1.

It will be observed that in the present case, at the conclusion of conversation, should the called subscriber first replace his receiver, the first selector F' would be restored to normal so that switch 130 would be shifted back to again engage its contact. This will not, however, cause the calling lamp 128 to again glow since the relay 51, by its armature 52, will have locked itself to ground through contact 35 at line selector E' and by its armature 5ᵃ, have opened the contact in the circuit of line contacts 128.

In the semi-automatic system just described, the reversal of the direction of current flow in the calling line is produced in the same manner as that described in connection with a purely automatic system. It will be observed in both of these cases that the continuation of the reversed flow after it is once produced, is dependent upon the relay 51 whose locking circuit is in no way controlled by the called subscriber or by the release of the first selector F or F' which the called subscriber can restore, for when energization of the relay 51 has once been produced it will continue until the calling subscriber replaces his receiver thereby restoring the line selector E or E' and opening contact 35.

In Fig. 8, I show at W the circuits of a preferred substation arrangement adapted for use in connection with party-line service. The said substation is connected by limbs P, S of his telephone line with the special form of line circuits C' in which the line relay 1ᵃ is provided with a pair of windings to which is connected the battery A¹ having its negative pole grounded. At W', W², W³, are indicated the taps for other substations which may be bridged across the limbs P, S in the same manner as the substation W. This arrangement is provided in order that when a subscriber desires to initiate a call, he may remove his receiver and thus establish a conductive bridge of limbs P and S without operating the line relay 1ᵃ. This being effected only when limb P of the line is grounded at the substation by the placing of a coin in the coin slot 209 after the receiver has been removed and the hook lever elevated. As will be seen, the interrupter 1² is normally connected operatively by means of an induction coil and condenser with limb S via normal contact 2ᵃ, to the end that a calling subscriber may, before depositing his coin, remove his receiver and listen upon the line; if the line be idle, he will receive a signal from the interrupter 1², which preferably operates to give a signal in a manner distinct from the usual busy back machine, which will advise him that the line is idle, whereon he will deposit his coin and proceed to complete the wanted connection. If the line be busy, i. e., already employed in connection with a call from one of the other stations W', W², or W³ connected to the line, the line relay 1ᵃ or cut-off relay 5 will be energized and the interrupter I² disconnected from the limb S, in which case the calling subscriber not hearing the signal, will know the line is busy and will replace his receiver.

At substation W, limb P normally extends through normal contact 215, through the call-bell and the lower switch contact of hook lever 200, the condenser 300 and through contact 214 to limb S; this circuit being inductive only, on account of the condenser 300 and forming a path transparent to rapidly alternating signaling current but opaque to direct current. The limb P also extends over a branch through the transmitter to alternate contact 204 of hook-lever 200, while limb S extends through normal contact 214, magnet 213 to alternate contact 203, so that when the receiver is removed and hook-lever 200 is raised, the two limbs P, S will be conductively united through a double contact 203—200—204. Spring 214, in addition to its connection with the condenser 300, has a connection extending to spring 206 of the pay-station device 209, whose other spring 207 is connected through the armature contact of relay 213 with the hook switch contact 201. The associated contact of spring 207 is in circuit relation with limb P through normal contact 215. The armature 301 of the polarized magnet 205 extends within the coin slot 209 and normally is in the intermediate position shown, the position being such as to serve as a support for the deposited coin, which when deposited, will descend by gravity and come to rest at the extremity of armature 301, and will press springs 206, 207 outward to engage their contacts. The calling device 210 is diagrammatically illustrated as a disk provided with teeth of insulating material, said disk being adapted to be rotated by hand in the direction of the arrow, a spring being provided to return it in the opposite direction, when released, for actuation of springs 211, 212.

It being assumed that the subscriber at substation W desires to initiate a call, he will first remove the receiver from hook-lever 200, which will thereupon rise to close contact 203—200—204, whereafter the subscriber will listen and the line being assumed to be idle, will receive a signal advising him of this from interrupter I² over a circuit extending through normal contacts 2ᵃ and 9, over limb S, contact 214, condenser 300, the telephone receiver, contact 200—204, the transmitter, contact 215, returning over limb P, normal contact 7, upper winding of relay 1ᵃ to battery. The subscriber will thereupon deposit a coin in slot 209 which will close contacts 206, 207, as before described. A circuit will thereupon be closed as follows: from ground through contact 201 (contacts 201 and 202 having been shifted to their alternate positions on the removal of the receiver), normal contact of relay 213, resistance 208, closed contact 207, contact 215, over limb P, contact 7, upper winding of relay 1ᵃ to battery A', the energized relay 1ᵃ thereon locking itself by current through its locking winding and master-switch relay 15 to battery B'. As soon as relay 1ᵃ is energized, armature 2ᵃ disconnects interrupter I² so that any other subscriber listening in will know that the line is busy. The contact wipers 20, 22, 24, 26, may be considered the wipers of the line selector E of Fig. 1, Fig. 8 being superposed on Fig. 1 with its right edge upon dotted line Y Y, and the said line selector will now be automatically operated, as before described, to seek out the terminal contacts of the calling line. As soon as this has occurred, the batteries A² and B² will be bridged across the calling line and current will flow from battery A² through primary relay PR', normal contact 53, to the left over the upper talking conductor, through contact 22, 21, alternate contact 7, line limb P, contact 215, through the transmitter, contact 204—200—203, through relay 213, energizing it, through contact 214, over limb S, contact 23—24, to the right over the lower talking conductor, normal contact at 54, relay SR' to battery B². Thus relay 213 is energized to attract its right-hand armature to open the before traced connection from ground at spring 201 extending to limb P, and its left hand armature, to withdraw the locking pawl from the dial 210, the said dial having been locked while relay 213 was deënergized, and so continuing until the calling line was selected by the line selector. The calling subscriber W will now operate dial 210 to count out the number of the called-for subscriber, and assuming this number to be 2345, he will first rotate the dial until two teeth are brought below spring 212 and thereafter release it. In its return, the second tooth brought below the spring 212 will actuate the said spring to engage contact 215 and thereafter to cause the said contact 215 to disengage its normal spring. Thus, a maintaining circuit for SR' will be completed over limb S through spring 214, relay 213, contact 203—200—204, contact 215—212 to ground before the relay PR' is deënergized, whose deënergization is immediately produced by the opening of the normal contact 215. When the tooth passes above the end of spring 212, normal contact at 215 will be again closed whereby relays PR' and SR' will be held actuated over the metallic circuit of the line and contact 212 will return to normal. In the continued travel of the dial 210 back to normal, this operation will be repeated and two deënergizations of relay PR' will be produced, while relay SR' is held energized. After the last of these, the last tooth at the left of dial 210 will cause spring 211 to engage contact 214 and thereafter break the normal connection at said contact 214, whereby a maintaining circuit for relay PR' will first be established, extending through contact 215, the transmitter and hooklever 200, through relay 213, contact 214—211, to ground, whereafter the opening of contact 214 will deënergize relay SR', while relay PR' remains energized. As the said tooth passes below spring 211, the spring is restored and the two relays held operated over the metallic circuit of the line. It is thus apparent that by successive operations of dial 210, the subscriber may count out the called subscriber's number, deënergizations of PR' being produced in number corresponding to the number of teeth passed below spring 212 on each operation of the dial 210, each said deënergization being followed by a single deënergization of relay SR'.

It will be noted that while the receiver is off the hook and the coin deposited in slot 209, the polarized magnet 205 still has its circuit open at contact 202 which was shifted, along with 201, when the receiver was removed. Let it first be assumed that the line of the called-for subscriber was found busy by the connector, in which case the calling subscriber, of course, receives a busy signal in his receiver. In such case, there will have been no reversal of the connections of batteries A² and B² to the calling line, that of W. When now the subscriber at W replaces his receiver, contact 202 will be closed before lever 200 disengages contacts 203—204 which are following contacts. Thus, on replacing the receiver, the shifting of the hook-lever does not open at once the circuit of line limbs P, S, connection being traceable over the limb S through contact 214, the closed contact 206, through magnet 205, contact 202, contact 215 to limb P and current will flow through its circuit from the bridged batteries A² and B², through said magnet 205 in a direction to tilt its armature to the right, which armature will then be removed from supporting relation from the deposited coin which will descend through the left-hand branch of slot 209 and be returned to the subscriber. If, however, the called subscriber had answered the call, the connections of batteries A² and B² to the calling line would have been automatically reversed by the response and when the calling subscriber replaced his receiver at the conclusion of conversation, the current through magnet 205 would be of opposite polarity from that flowing therethrough when the called-for line was found busy. On account of the opposite polarity, the armature of magnet 205 would of course be tilted to the left, allowing the coin to then descend by the right branch of slot 209 into the till, being thus collected.

It is thus seen that the calling subscriber, provided with the pay-station device of my invention, by the replacing of his receiver, practically tests the battery connections which exist to his line at that time, and that the single polarized magnet 205 operates in response to the testing to either collect or return the coin according as the calling subscriber has received a response to his call or has failed to receive one. This system of operation whereby the calling subscriber tests a current flow in his own line at the conclusion of conversation for the purposes of determining whether or not a charge shall be made against the line, is believed to be novel and will be broadly claimed.

Figure 11:
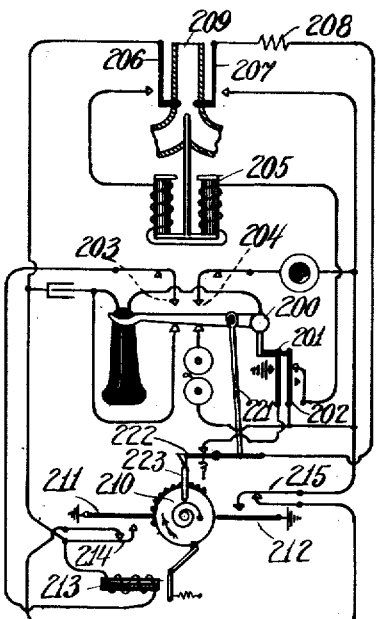

The structure of Fig. 11 is largely similar to that of Fig. 8 as to its substation features, the distinguishing characteristics of Fig. 11 being that the right-hand armature of relay 213 is dispensed with. To secure the opening of the connection at spring 201, before the dial 210 begins its operative openings of contact 215, I provide a ratchet bar 222 pivoted at about its middle point and linked insulatingly by arm 221 to hook-lever 200, the bar 221 having a lost motion coupling with the hook-lever. Thus, when the receiver is removed from the hook-lever 200, the switch contacts controlled thereby are closed as in the case of Fig. 8, and when the coin is deposited in the slot 209 (after the subscriber has listened and found the party-line idle) current will flow from ground through spring 201, contact 222, contact 207, and contact 215 over line P to energize the line relay 1ª, it being understood that the substation Fig. 11 is to be operated in connection with the line circuit at C'. As soon as the line is selected, the magnet 213 will be energized to unlock the calling device 210. As soon as the subscriber rotates the dial in the direction of the arrow to transmit the first impulses, the arm 223 fastened to the dial will free the end of pawl 222, which will then be tilted about its pivot by the associated spring to open the contact 223, the lost motion connecting at 200 permitting of this. When the calling subscriber replaces his receiver, the coin will be collected or restored as in Fig. 8 and arm 221 will restore the pawl 222 to close its contact, whereon arm 210 will assume its normal position.

The structure illustrated in Fig. 9 is for use in connection with the semi-automatic telephone system heretofore described, and is substantially the same as that of the substation of Fig. 8 except that the calling device mechanism is omitted and the circuit connections required therefor. No detailed description of Fig. 9 is therefore necessary, the parts in Fig. 9 corresponding to those of Fig. 8, having been given like reference characters.

It will be noted that in each of the substation arrangements shown in Figs. 8, 9 and 11, the well known arrangement of talking connections is employed involving parallel paths through the substation. The circuit of line limb P, after passing through the transmitter, has two connections extending to limb S, one connection being opaque to voice currents and transparent to direct currents by the inclusion of the impedance of the relay 213 in said bridge, while the other bridge is opaque to direct current and transparent to voice currents by the inclusion of the condenser 300, this latter path also including the telephone receiver. It is thus seen that I employ the winding of the impedance coil in use in connection with the talking circuit as a relay or magnet to control the unlocking of the dial and also by an armature switch to control the circuit connection of the line limb P to the ground at spring 201.

Figure 13:
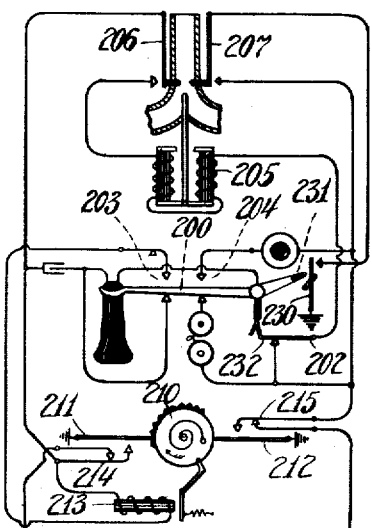

In the structure of Fig. 13, the calling subscriber must first remove his receiver and listen to ascertain the idle or busy condition of the line, the said structure being for use in connection with party lines. The receiver is then to be replaced and a coin dropped in the pay-station, closing contacts 206, 207. The receiver, being again removed, the using of the hook-lever, by the stud at the end of arm 231 passes down on the left side of the slantingly mounted actuating member of spring 230, causing said spring to momentarily engage its associated contact, whereby the initial energizing circuit for relay $1^a$ (Fig. 8) is closed and the selection by the line selector proceeds as before, the calling device being thereon duly unlocked by magnet 213. When lever 200 is fully elevated, the stud on 231 is below the actuating member, so that on replacing of the receiver it will pass upon the right side thereof to normal without causing a second grounding of limb P. The circuit of magnet 213 is completed when the receiver is replaced as in the preceding figures.

The structure shown in Fig. 10 may be employed in connection with the system of Fig. 1. The removal of the receiver in Fig. 10 will obviously operate line relay 1 of Fig. 1, causing the line selector to select. In Fig. 10, the deposit of a coin is thus unnecessary at the start. However, the calling subscriber cannot complete the call without depositing a coin because the contact at 215 is short-circuited by the wires leading to contact 220, so that no opening of limb P can be produced to control relay PR' until a coin is deposited. Moreover the magnet 213 is normally short-circuited at normal contact 206 so that, until a coin has been deposited, magnet 213 cannot be actuated to unlock the dial. But one of the short circuits described are necessary in a single structure, but I have shown two to illustrate the general applicability of a normal short circuit rendering a signal circuit inoperable.

Figure 12:
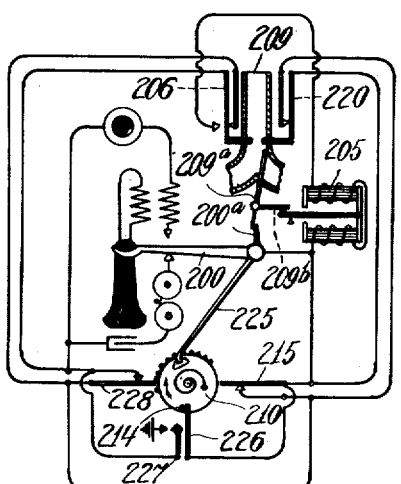

In Fig. 12 is shown a structure employing an induction coil common battery talking circuit. Here an arm 225 unlocks dial 210 on removal of the receiver. Arm $200^a$ normally holds pivoted coin support $209^a$ in the coin freeing position. On removal of the receiver, arm $200^a$ frees the support which moves to the supporting position. Obviously, device 210 is inoperative till a coin is deposited, contacts 228, 215 being short-circuited at 206 and 220, the subscriber being thus obligated to deposit his coin. The current flowing in the line until the called for subscriber answers, is in a direction to tend to throw the armature of magnet 205 downward, this obviously having no effect upon support $209^a$. As soon, however, as the called-for subscriber answers, the reversed current throws the armature of magnet 205 upward which actuates support $209^a$ to collect the deposited coin.

The mechanical switch, Figs. 3 to 7, will now be briefly referred to, it being understood that any suitable mechanism may be employed. The diagrammatically illustrated switch of Figs. 3 to 7 is more specifically the line selector E or E'. As indicated in Figs. 3 and 4, in which latter figure each line contact set 19, 21, 23, is indicated by a single short line, the line contacts are arranged in ten vertical rows, each row being a group, the said contact sets projecting as from the inner surface of a section of a sphere. The group contacts 25 are located immediately below their respective groups. The wipers 20, 22, 24, and group wiper 26 are connected with the rotary primary shaft PS, wiper 26 being rigidly connected, while wipers 20, 22, 24 are pivotally connected at 350. Primary movements of the wipers are effected by rotating shafts PS step-by-step from left to right, a ratchet 355, Fig. 7, being fastened to said shaft and adapted to be driven by armature actuated pawl 356 of magnet PM, the retaining pawl 357 being provided to prevent return movement under the influence of spring 352 against whose tension shaft PS is rotated. Each actuation of pawl 356 steps ratchet 355 and shaft PS to move wipers 20, 22, 24, opposite the next contact group, wiper 26 being correspondingly moved to engage the next group contact 25. Secondary movements of wipers 20, 22, 24, (wiper 26 then remaining motionless) are effected, after the primary adjustment is completed, by secondary magnet SM whose armature actuated pawl 359 engages the teeth of its associated ratchet cut in shaft SS. Said shaft has fastened to it a broad piece 351 which engages an antifriction bearing in the rearwardly extending support of wipers 20, 22, 24, said piece being broad so that however the wipers may be primarily adjusted, the bearing will still engage said piece 351. Successive actuations of magnet SM, by pawl 359, step shaft SS downward, retaining pawl 360 holding the shaft against back movement under the influence of spring 353, whose tension is exerted against the downward movement of SS being linked thereto by the pivoted lever 354 loosely engaging a screw on shaft SS. Each downward step of shaft SS by piece 351 steps the contact ends of wipers 20, 22, 24, a step upward to engage a next set of contacts 19, 21, 23. To release the switch, release magnet RM is energized. Its attracted armature 358 turns retaining pawl 357 about its pivot to disengage ratchet 355, which pawl being in interlocking relation with retaining pawl 360 withdraws the latter to disengage the retaining ratchet by shaft SS. The secondary shaft SS is now restored by spring 353, the wipers 20, 22, 24, being brought down to free the contact bank. To prevent tension of spring 352 from being effective while shaft SS is restoring, detent 370 is provided upon piece 361, which piece, when shaft SS is at normal, is pressed upward by piece 371. The first downward step of shaft SS permits piece 361 to fall down when detent 370 will engage any adjacent tooth of ratchet 355 to hold the ratchet and shaft PS, in adjusted position until the shaft SS reaches normal, when piece 371 lifts piece 361, bringing detent 370 to normal when spring 352 is free to restore the primary shaft and wipers.

It is obvious that movement of piece 361 on the first step of shaft SS permits the secondary off-normal SO, springs to shift by their tension to their alternate positions, while the restoration of shaft SS, restoring piece 361, also restores the secondary off-normal springs. Piece 364 fastened to primary shaft PS, Fig. 6, has a stud 363 normally engaging the controlling spring of the primary off-normal, PO, contacts. With the first step of shaft PS, stud 363 frees said spring and the off-normal contacts shift under their tension. On restoration of shaft PS, stud 363 engages the controlling spring shifting the contacts back to normal. For first selector F, second selector G and connector H, the mechanical arrangement of Figs. 3 to 7 may be employed, the arrangements of primary and secondary off-normal contacts indicated in Fig. 1 being of course provided. The group wiper 26 and contacts 25 are, of course, unnecessary for these employments. As before indicated, for the connector H, two secondary steps of the wipers are required to bring the wipers to engage the first contact set of a selected group.

Obviously my invention is not to be limited to the precise arrangement herein shown and described, as my invention, as already indicated, is not only capable of employment in various environments but is readily susceptible to modification to meet different environments as has been herein exemplified. In the structures which I have illustrated, I have chosen to cause the unlocking of the automatic substation dial to be effected by electrical circuit changes produced in consequence of the closure of a contact by the deposit of a coin. But it is, of course, within the scope of the invention that this unlocking be produced mechanically by the coin. Other modifications of the structures will readily suggest themselves to those skilled in the art, and I therefore, do not wish to be limited in this respect.

While I have shown a plurality of battery symbols in the circuit diagrams, it will be understood that such symbols as have their like poles grounded may be, and preferably are, a single source of current. Similarly, the multiplicity of generator symbols do not necessarily indicate separate sources of current.

Having thus described my invention, what I claim is:

1. A telephone substation including a switch hook, an automatic dial calling device, a member normally locking the dial of said device against actuation, a pay station device, and electromagnetic means including said member controlled by a deposited coin for unlocking the dial of said calling device.

2. A telephone substation including a switch hook, an automatic dial calling device, a member normally locking the dial of said calling device against actuation, a pay-station device, electromagnetic means including said member controlled by a deposited coin for unlocking said calling device, and mechanism for collecting or freeing a deposited coin according as a response is or is not secured.

3. A telephone system including a calling telephone line, a calling device at the substation, a member normally locking said calling device against actuation, a pay-station device, means including said member controlled by a deposited coin for unlocking said calling device, a hook switch at the substation of said line, mechanism effective when the receiver is replaced thereon to test said line, and means whereby a deposited coin will be collected if a response has been secured or freed if there has been no response rendered effective by such test.

4. A telephone system including a calling telephone line, a called telephone line, a pay station device at the calling substation, a signaling circuit having a contact controlled by the deposit of a coin in said device, means for connecting said lines, and means effective when the receiver of the calling substation is replaced upon its switch hook, whereby a deposited coin will be collected if a response has been secured, or to free a deposited coin if there has been no response.

5. A telephone system including a calling telephone line, a called telephone line, a signaling circuit having a contact controlled by deposit of a coin in said device, automatic switches for connecting said lines, subscriber actuted means for causing disconnection, and apparatus responsive to said means when actuated, to collect or free a deposited coin according as a response from the called substation has or has not been secured.

6. A telephone system including a substation telephone line having a definite electrical condition, means for impressing an altered electrical condition upon said line, and means for receiving a deposited coin, said means effective by the replacing of the receiver upon the switch hook at the substation to render said mechanism sensitive to either electrical condition of the line to collect or free a deposited coin according to the electrical condition of the line.

7. A telephone system including a calling substation line and a called substation line connected together at the exchange, said calling line having a definite electrical condition, means controlled by a response from the called substation for altering said condition, a pay station mechanism adapted to receive a deposited coin, and a test device at the calling substation adapted to be placed in operative association with the calling line when the receiver is replaced for disconnection, and means included in said mechanism thereby effective to collect or free a deposited coin according as said line is in said altered or definite electrical condition.

8. A telephone system, including a calling telephone line, a pay station device at the substation thereof, adapted to receive a coin, a polarized controlling magnet for determining the disposal of a deposited coin associated with said device, a central source supplying current in bridge of said line, a called telephone line, means actuated by the response at the called substation to reverse the direction of current in the calling line, means independent of control at the called substation for continuing said reversed flow of current until the receiver at the calling substation is replaced, and mechanism for rendering said polarized magnet sensitive to either direction of current flow in the line when the calling receiver is replaced whereby said magnet is effective to collect or free a deposited coin according as the current flow is then in one direction or the other.

9. A telephone system, including a calling telephone line, a pay station device at the substation thereof adapted to receive a coin, a polarized controlling magnet for determining the disposal of a coin when deposited in said device, a central source supplying current in bridge of said line, a called telephone line, means actuated by the response at the called substation, to reverse the direction of current flow in the calling line, and means independent of control at the called substation for continuing said reversed flow of current until the receiver at the calling substation is replaced, and means effective upon the replacing of the receiver whereby said magnet is operated according to the direction of current flow.

10. A telephone system, including a calling telephone line, a pay station device at the substation thereof adapted to receive a coin, a polarized controlling magnet for determining the disposal of a coin when deposited in said device, a central source supplying current in bridge of said line, a called telephone line, means actuated by the response at the called substation to reverse the direction of current flow in the calling line, means independent of control at the called substation for continuing said reversed flow of current until the receiver at the calling substation is replaced, and mechanism effective when the receiver is replaced for disconnection for rendering said polarized magnet sensitive to either direction of current flow, whereby said magnet is effective to collect or free a deposited coin according as the current flow is then in one direction or the other.

11. A telephone system including a calling telephone line, a substation therefor, a pay-station thereat having a polarized magnet, three branches of said line through the substation, a first branch including call signaling mechanism, a second branch including a telephone transmitter, and a third branch including said magnet, means effective on the removal of the receiver to open said first branch and close said second branch, means effective only when said receiver is thereafter replaced to close a contact of said third branch and open said second branch, a called subscriber's line, a switch operated by the response of the called subscriber, to reverse the direction of current flow in the calling line, and a coin disposing device controlled by said magnet, said magnet being effective when operatively connected with said line to collect or free a deposited coin according as said current is reversed or not.

12. A telephone system including a calling telephone line, a substation therefor, a pay-station thereat having a polarized magnet, three branches of said line through the substation, a first branch including call signaling mechanism, a second branch including a telephone transmitter, and a third branch including said magnet, means effective on the removal of the receiver to open said first branch and close said second branch, means effective only when said receiver is thereafter replaced to close a contact of said third branch and open said second branch, a switch contact controlled by a deposited coin to close a contact of said third branch whereby the replacing of the receiver while a coin is deposited operatively connects said magnet with said telephone line, means effective to cause a flow of current over the circuit of said line, a called subscriber's line, a switch operated by the response of the called subscriber to reverse the direction of current flow in the calling line, means for thereafter continuing said reversed flow independently of the subscribers, and a coin disposing device controlled by said magnet, said magnet being effective when operatively connected with said line to collect or free a deposited coin according as said current is reversed or not.

13. A telephone system including a calling telephone line, a substation therefor, a pay-station thereat having a polarized magnet, three branches of said line through the substation, a first branch including call signaling mechanism, a second branch including a telephone transmitter, and a third branch including said magnet, means effective on the removal of the receiver to open said first branch and close said second branch, a switch contact controlled by a deposited coin to close a contact of said third branch whereby the replacing of the receiver while a coin is deposited operatively connects said magnet with said telephone line, a called subscriber's line, a switch operated by the response of the called subscriber to reverse the direction of current flow in the calling line, and a coin disposing device controlled by said magnet, said magnet being effective when operatively connected with said line to collect or free a deposited coin according as said current is reversed or not.

14. A telephone system including a calling telephone line, a substation therefor, a pay-station thereat having a polarized magnet, three branches of said line through the substation, a first branch including call signaling mechanism, a second branch including a telephone transmitter, and a third branch including said magnet, means effective on the removal of the receiver to open said first branch and close said second branch, a signaling circuit effective only when a coin is deposited in said pay-station, a switch contact controlled by a deposited coin to close a contact of said third branch whereby the replacing of the receiver while a coin is deposited operatively connects said magnet with said telephone line, a called subscriber's line, a switch operated by the response of the called subscriber to reverse the direction of current flow in the calling line, and a coin disposing device controlled by said magnet, said magnet being effective when operatively connected with said line to collect or free a deposited coin according as said current is reversed or not.

15. The combination with a telephone line, of a pay-station device including a magnet, a circuit at the substation for said magnet, a signaling circuit for said substation, switch contacts included in both said circuits adapted to be closed by the deposit of a coin, means controlled by the removal of the receiver for rendering said magnet circuit inoperative and for closing said signaling circuit, said means being operated when the receiver is replaced to operatively associate said magnet with the line, a called telephone line adapted for connection with said first mentioned line, and means for actuating said magnet when so operatively associated with the line to collect or free a deposited coin according as a response has or has not been made from the called line.

16. A telephone system including a calling telephone line, a called telephone line, means to connect said lines, a pay-station device at the calling substation, means whereby the replacing of the receiver at the calling substation will collect or free a deposited coin according as a response at the called substation has or has not been secured, and means for preventing disposal of a deposited coin until the calling receiver is replaced.

17. A telephone system including a calling telephone line, a called telephone line, means to connect said lines, a pay-station device at the calling substation, a single magnet and means associated with said device effective on the replacing of the receiver at the calling substation to collect or free a deposited coin according as a response at the called substation has or has not been secured, and means for preventing disposal of a deposited coin until the called receiver is replaced.

18. A telephone system including a telephone line, means for impressing current flowing in either direction upon said line, a polarized coin controlling magnet at the substation of said line, means controlled by the replacing of the receiver to render said magnet operable by the current flowing in said line, and means to prevent effective operation of the magnet until the calling receiver is replaced.

19. A telephone system including a calling telephone line, a pay-station device at the substation thereof, a magnet therefor controlling disposition of a deposited coin, means for impressing current flowing in either direction upon said line, mechanism controlled by the replacing of the receiver at the substation to render said magnet operative by the current over said line, said magnet being effective to free or collect a deposited coin according as the current flow is in one direction or the other, and means to prevent effective operation of the magnet until the calling receiver is replaced.

20. A telephone system including a telephone line, a pay-station device at the substation thereof, electro-magnetic mechanism associated therewith, means for impressing current flowing in either direction upon said line, a switch at the substation of said line, and means controlled by the replacing of the receiver at the substation to actuate said switch to place said mechanism in operative relation with the line whereby said mechanism will collect or free a deposited coin according as the current flow is in one direction or the other, and means to prevent effective operation of the mechanism until the calling receiver is replaced.

21. A telephone substation including a coin collecting device, a calling device, a member for locking said calling device against actuation, a magnet controlling said member for unlocking said device, a closed shunt circuit for preventing the effective calling operation of said calling device, and means controlled by the deposit of a coin in said device to render said shunt circuit ineffective.

22. In a prepayment system for telephone exchanges, a substation telephone line, a source of current, means for impressing current flowing in either direction over said line, a pay-station device, a polarized coin controlling magnet for said device, suitable circuit connections between said device and telephone line, and an open contact included in said circuit connections adapted to be closed when the receiver is replaced to operatively connect said magnet and said line whereby said magnet is operated by said current.

23. In a prepayment system for telephone exchanges, a substation telephone line, a pay station device adapted to receive a deposited coin, a coin controlling magnet therefor, mechanism operated thereby to collect or free a deposited coin, automatic apparatus for extending the circuit of said line, a substation switch operated for controlling the restoration of said line and automatic apparatus to normal, and means also effective responsive to such operation for actuating said magnet to dispose of a deposited coin.

24. An automatic telephone substation, a directive impulse transmitter at the substation, closed short circuit connections at the substation for rendering said transmitter inoperative, a pay-station device at the substation, and mechanism included in said device effective on deposit of a coin to open said short circuit connections.

25. A telephone system including a calling telephone line, a substation therefor, a pay-station thereat having a polarized magnet, three branches of said line through the substation, a first branch including call signaling mechanism, a second branch including a telephone transmitter, and a third branch including said magnet, means effective on the removal of the receiver to open said first branch and close said second branch, means effective only when said receiver is thereafter replaced to bring said third branch into operative relation with the line and to open said second branch, a called subscriber's line, a switch operated by the response of the called subscriber to reverse the direction of current flow in the calling line, and a coin disposing device controlled by said magnet, said magnet being effective when operatively connected with said line to collect or free a deposited coin according as said current is reversed or not.

26. A telephone system including a calling telephone line, a substation therefor, a pay-station thereat having a polarized magnet, three branches of said line through the substation, a first branch including call signaling mechanism, a second branch including a telephone transmitter, and a third branch including said magnet, means effective on the removal of the receiver to open said first branch and close said second branch, means effective only when said receiver is thereafter replaced to bring said third branch into operative relation with the line and to open said second branch, a switch contact controlled by a deposited coin to close a contact of said third branch whereby the replacing of the receiver while a coin is deposited operatively connects said magnet with said telephone line, means effective to cause a flow of current over the circuit of said line, a called subscriber's line, a switch operated by the response of the called subscriber to reverse the direction of current flow in the calling line, means for thereafter continuing said reversed flow independently of the subscribers, and a coin disposing device controlled by said magnet, said magnet being effective when operatively connected with said line to collect or free a deposited coin according as said current is reversed or not.

27. A telephone substation including a coin collecting device, a calling device at the substation, closed circuit connections in shunt of said calling device for preventing effective calling operation thereof, and contacts included in said circuit connections controlled by deposit of a coin in said device to render said shunt circuit connections ineffective to prevent operation of the device.

28. A telephone substation including a pay-station device, a coin controlling magnet for said device, a metallic control circuit for said magnet including switch hook contacts, under control of the subscriber for operatively connecting said magnet in metallic circuit with the line, and means to prevent such operative connection until the receiver is replaced.

29. A telephone system including a calling telephone line switched to connection at the exchange, a source of current in bridge of said line, a pay-station device at the substation, a magnet therefor, metallic circuit connections including said magnet and said source of current closed when the receiver is replaced, to operate said magnet for disposal of a deposited coin, and automatic means for thereafter interrupting said metallic circuit.

30. A telephone system including a calling telephone line, automatic switches at the exchange for extending the circuit of said line, a source of current in bridge of said line, a pay-station device at the substation of said telephone line, a magnet therefor, metallic circuit connections including said magnet and said source of current closed when the receiver is replaced to operate said magnet for the disposal of a deposited coin, automatic means for thereafter interrupting said metallic circuit, and means responsive to the interruption of said metallic circuit to effect the release of the automatic switches.

In witness whereof, I hereunto subscribe my name this 5th day of December, 1907.

GEORGE E. MUELLER.

Witnesses:
CAROLYN WEBER,
T. H. FERGUSON.

Correction in Letters Patent No. 1,174,599.

It is hereby certified that in Letters Patent No. 1,174,599, granted March 7, 1916, upon the application of George E. Mueller, of Aurora, Illinois, for an improvement in "Telephone Pay-Stations," an error appears in the printed specification requiring correction as follows: Page 13, line 122, claim 17, for the word "called" read *calling;* and that the said Letters Patent should be read with this correction therein that the same may conform to the record of the case in the Patent Office.

Signed and sealed this 18th day of April, A. D., 1916.

[SEAL.]

Cl. 179—6.5.

R. F. WHITEHEAD,
*Acting Commissioner of Patents.*